(12) United States Patent
Uryu

(10) Patent No.: US 11,081,938 B2
(45) Date of Patent: Aug. 3, 2021

(54) STATOR

(71) Applicant: TOYOTA JIDOSHA KABUSHIKI KAISHA, Toyota (JP)

(72) Inventor: Hazuki Uryu, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 168 days.

(21) Appl. No.: 16/576,873

(22) Filed: Sep. 20, 2019

(65) Prior Publication Data

US 2020/0177057 A1 Jun. 4, 2020

(30) Foreign Application Priority Data

Dec. 3, 2018 (JP) .............................. JP2018-226688

(51) Int. Cl.
*H02K 9/22* (2006.01)
*H02K 3/34* (2006.01)
*H02K 1/16* (2006.01)

(52) U.S. Cl.
CPC ................. *H02K 9/22* (2013.01); *H02K 1/16* (2013.01); *H02K 3/345* (2013.01)

(58) Field of Classification Search
CPC ............. H02K 9/22; H02K 1/16; H02K 3/345
See application file for complete search history.

(56) References Cited

U.S. PATENT DOCUMENTS

| | | | |
|---|---|---|---|
| 9,831,727 B2* | 11/2017 | Brahmavar | H02K 21/16 |
| 10,897,173 B2* | 1/2021 | Yamaguchi | H02K 3/12 |
| 2010/0244615 A1 | 9/2010 | Kouda | |
| 2018/0109156 A1* | 4/2018 | Yamaguchi | H02K 3/345 |
| 2019/0020239 A1* | 1/2019 | Tsujimori | H02K 1/16 |
| 2019/0280549 A1* | 9/2019 | Inoue | H02K 1/16 |
| 2020/0177057 A1* | 6/2020 | Uryu | H02K 3/345 |

FOREIGN PATENT DOCUMENTS

| | | |
|---|---|---|
| JP | 2002-262500 A | 9/2002 |
| JP | 2003-284277 A | 10/2003 |
| JP | 2010-259316 A | 11/2010 |
| JP | 2018-098948 A | 6/2018 |

* cited by examiner

*Primary Examiner* — Robert W Horn
(74) *Attorney, Agent, or Firm* — Oliff PLC

(57) ABSTRACT

A stator includes: a stator core, the stator core including a plurality of slots arranged in a circumferential direction of the stator core and recessed in a radial direction of the stator core; a coil disposed in each of the slots; an insulating heat-dissipating member disposed between the stator core and the coil on one of two side surfaces of the slot in the circumferential direction of the stator core; and an insulating foaming member disposed between the stator core and the coil on the other of the two side surfaces of the slot in the circumferential direction of the stator core.

3 Claims, 3 Drawing Sheets

STATOR

INCORPORATION BY REFERENCE

The disclosure of Japanese Patent Application No. 2018-226688 filed on Dec. 3, 2018 including the specification, drawings and abstract is incorporated herein by reference in its entirety.

BACKGROUND

1. Technical Field

The present disclosure relates to a stator of a rotary electric machine in which a coil is disposed on a stator core.

2. Description of Related Art

There are cases where a functional member is disposed between a stator core and a coil in each slot of the stator core of a stator in a rotary electric machine.

Japanese Unexamined Patent Application Publication No. 2002-262500 (JP 2002-262500 A) describes a configuration in which a bimetallic strip is provided. During operation of the rotary electric machine, a coil is pressed against a stator core by the bimetallic strip deformed due to a rise in temperature, whereby thermal conductivity from the coil to the stator core is enhanced.

Japanese Unexamined Patent Application Publication No. 2003-284277 (JP 2003-284277 A) describes a configuration in which a thermosetting resin having insulation properties and high thermal conductivity is disposed on the entire inner surface of the slot.

Japanese Unexamined Patent Application Publication No. 2010-259316 (JP 2010-259316 A) describes a configuration in which a foamable sheet is provided on the entire inner surface of the slot to fix the coil. JP 2010-259316 A also describes a configuration in which a foamable sheet is provided only on one side surface of the slot to fix the coil, and the stator core and the coil are separated from each other at the remaining side surfaces.

Japanese Unexamined Patent Application Publication No. 2018-098948 (JP 2018-098948 A) describes a configuration in which an insulating sheet is provided on the entire inner surface of the slot. A foamable thermosetting resin is applied to the insulating sheet. When the resin expands due to foaming, a coil is held in close contact with the stator core. By reducing the amount of resin to be applied to a bent portion of the sheet, occurrence of cracks at the bent portion is suppressed.

SUMMARY

In the configuration of JP 2002-262500 A, although heat dissipation from the coil is secured, the bimetallic strip may vibrate during operation of the motor because the bimetallic strip is not fixed to the stator core nor to the coil. The vibrating bimetallic strip may wear an insulation coating of the coil and break the insulation.

In the configuration of JP 2003-284277 A, the coil and the thermosetting resin are not in close contact with each other, so that the stability of the coil and the heat dissipation from the coil through the thermosetting resin may be insufficient.

In contrast, when the foamable resin is provided on all the side surfaces in the slot as in JP 2010-259316 A and JP 2018-098948 A, the heat dissipation from the coil is reduced. JP 2010-259316 A describes the mode in which the foamable sheet is provided on one side surface of the stator core. However, the coil and the stator core are separated from each other at the other side surfaces, so that the thermal conductivity from the coil to the stator core is considered to be low.

The present disclosure provides a stator with enhanced adhesion and thermal conductivity between a coil and a stator core in a slot.

A stator according to an aspect of the present disclosure includes: a stator core, the stator core including a plurality of slots arranged in a circumferential direction of the stator core and recessed in a radial direction of the stator core; a coil disposed in each of the slots; an insulating heat-dissipating member disposed between the stator core and the coil on one of two side surfaces of the slot in the circumferential direction of the stator core; and an insulating foaming member disposed between the stator core and the coil on the other of the two side surfaces of the slot in the circumferential direction of the stator core.

The stator is disposed in a rotary electric machine (either one or both of a motor and a generator) so as to surround a rotor. The slots recessed in the radial direction are arranged in the circumferential direction on an inner peripheral surface of the stator core of the stator. The coil is disposed in the slots. The coil is normally formed by winding a conductive wire across a plurality of slots.

The insulating heat-dissipating member is disposed on one of the two side surfaces of the slot (two side walls of a recess) in the circumferential direction of the stator core, and the insulating foaming member is disposed on the other side surface. As the heat-dissipating member, a member having thermal conductivity at least higher than that of the foaming member and sufficient for suppressing a rise in temperature is selected.

Once the foaming member is solidified to fix the coil to the stator core, the stator core is stabilized without vibrating. In addition, as the foaming member expands, the coil is pressed against the other side surface of the slot. This improves the efficiency of heat transfer from the coil to the stator core through the heat-dissipating member.

In the stator according to above aspect, the insulating heat-dissipating member may be a member having a heat-dissipating material bonded to an insulating sheet, and the insulating foaming member may be a member having a foamable material bonded to an insulating sheet.

In the stator according to the above aspect, the insulating heat-dissipating member may be a heat-dissipating insulating sheet, the heat-dissipating insulating sheet may be disposed between the stator core and the coil so as to surround the coil in the slot; and the insulating foaming member may be a member having a foamable material bonded to the heat-dissipating insulating sheet.

According to the present disclosure, it is possible to provide a stator that secures stability of a coil and heat dissipation from the coil in a slot.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Embodiments will be described below with reference to the drawings. Although specific modes are shown in the description for facilitating understanding, these are examples of the embodiment and various other embodiments can be adopted.

Figure 1:
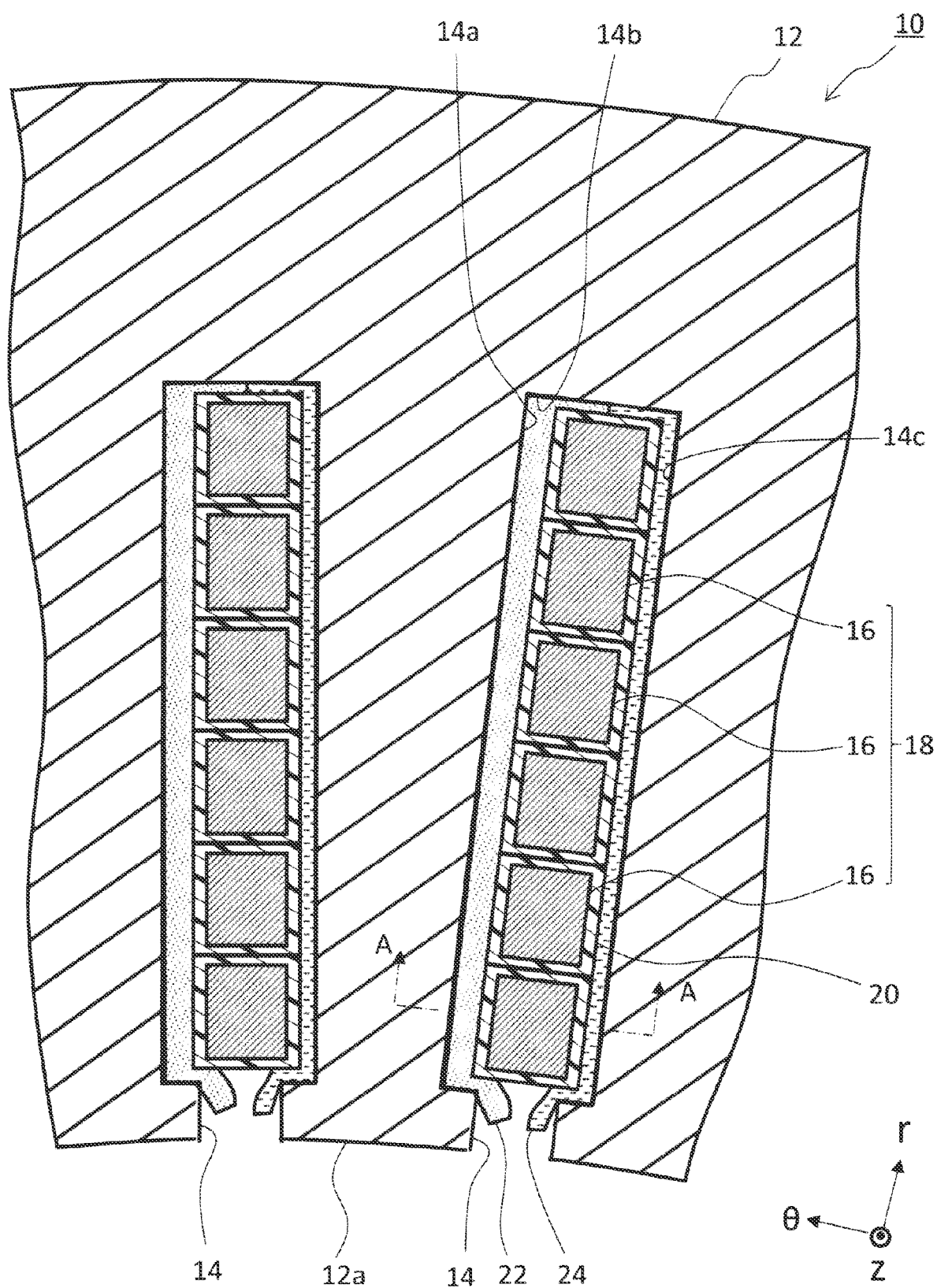
FIG. 1 is a schematic view showing a structure of a cross section of a stator.

FIG. 1 is a partial cross-sectional view of a stator 10 according to an embodiment. The stator 10 is formed into a substantially cylindrical shape, and a rotor (not shown) is installed radially inward thereof. In the coordinate system of FIG. 1, an r-axis indicates a radial direction (direction perpendicular to a rotation axis of the rotor), a θ-axis indicates a circumferential direction (rotation direction of the rotor), and a z-axis indicates an axial direction (direction in which the rotation axis extends). The same applies to FIGS. 2 and 3. FIG. 1 is a cross-sectional view of the stator 10 taken along a cut plane at a suitable position in the axial direction.

The stator 10 includes a stator core 12 formed by stacking in the axial direction thin electromagnetic steel sheets each stamped into a cylindrical shape. The electromagnetic steel sheet is formed by subjecting both sides of the steel sheet having enhanced electromagnetic characteristics to insulation process. The steel sheets are insulated from each other in the axial direction.

The stator core 12 is provided with slots 14 each having a groove shape recessed in the radial direction from an inner peripheral surface 12a. The slots 14 are arranged regularly in the circumferential direction. The slots 14 are formed so as to pass through all the electromagnetic steel sheets in the axial direction.

A coil 20 formed by winding a rectangular wire 16 having a rectangular cross section is disposed in each slot 14. The coil 20 is formed by inserting segment coils each having a substantially U shape from one side of the stator core 12 in the axial direction and connecting the segment coils by welding on the other side. However, the coil 20 may be disposed in the slots 14 in various other manners. For example, a mode in which a long conductive wire is wound or a mode in which split stator cores in which a wound coil is inserted are combined to form the stator 10 is conceivable.

The rectangular wire 16 of the coil 20 is covered with an insulating member 18 such as a resin. This secures insulation between adjacent rectangular wires 16. In addition, insulation between the rectangular wires 16 and the stator core 12 is also secured.

In each slot 14, a foaming sheet 22 and a heat dissipation sheet 24 are disposed between the stator core 12 and the coil 20. Specifically, the foaming sheet 22 is provided on a side surface 14a of the slot 14 on one side in the circumferential direction and about half a side surface 14b of the slot 14 on a side in the radial direction (a bottom surface of the recess). The heat dissipation sheet 24 is provided on the remaining half of the side surface 14b (bottom surface of the recess) and the entirety of a side surface 14c of the slot 14 on the other side in the circumferential direction.

The foaming sheet 22 is an example of an insulating foaming member, and is formed by impregnating an insulating sheet serving as a base material with a foamable thermosetting resin, which is an example of an insulating foaming material. As the insulating sheet, for example, a silicon sheet formed by weaving $SiO_2$ (silicon) fibers having high heat resistance is used. The foamable thermosetting resin is a porous resin formed by causing expansion of a gas dispersed in the resin. As the thermosetting resin, an insulating thermosetting resin having heat resistance characteristics is selected. In the state shown in FIG. 1, the foaming sheet 22 is disposed in the slot 14 and is solidified after being foamed and expanded by heating.

The heat dissipation sheet 24 is an example of an insulating heat dissipating member, and is a member formed by impregnating an insulating sheet serving as a base material with a heat-dissipating resin, which is an example of an insulating heat-dissipating material. As the insulating sheet, for example, a silicon sheet is used as in the case of the foaming sheet 22. Further, as the heat-dissipating resin, for example, a thermosetting resin containing a metal or ceramic having high thermal conductivity as a filler is used. In the state shown in FIG. 1, the heat dissipation sheet 24 is disposed in the slot 14 and solidified by being heated. Generally, the filler in the heat dissipation sheet 24 does not tend to appear on the surface of the resin or tends to appear in small pieces on the surface of the resin, so the heat dissipation sheet 24 has insulation properties as a whole.

Figure 2:
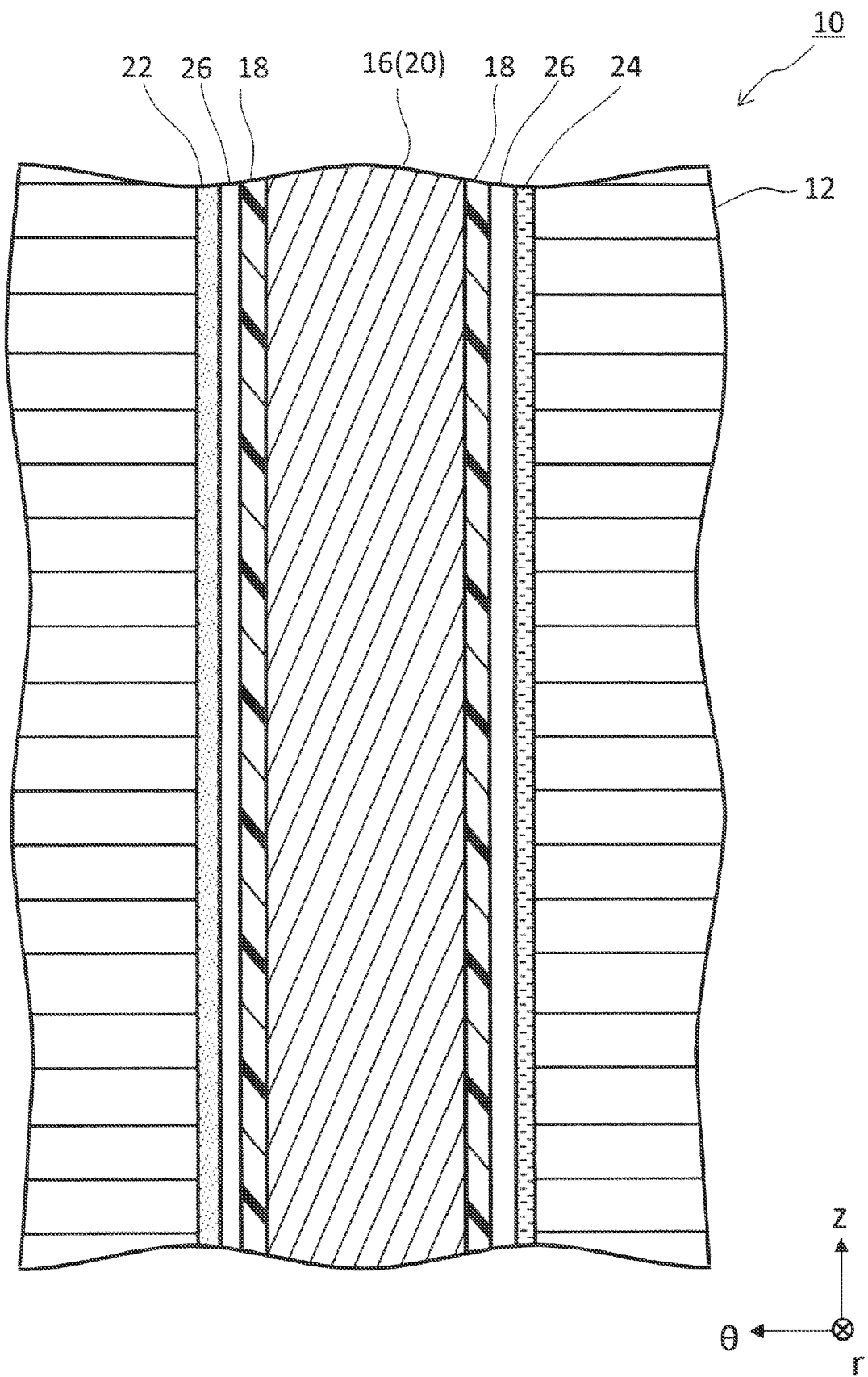
FIG. 2 is a sectional view taken along plane A-A of FIG. 1, which shows the stator partway through a manufacturing process.
Figure 3:
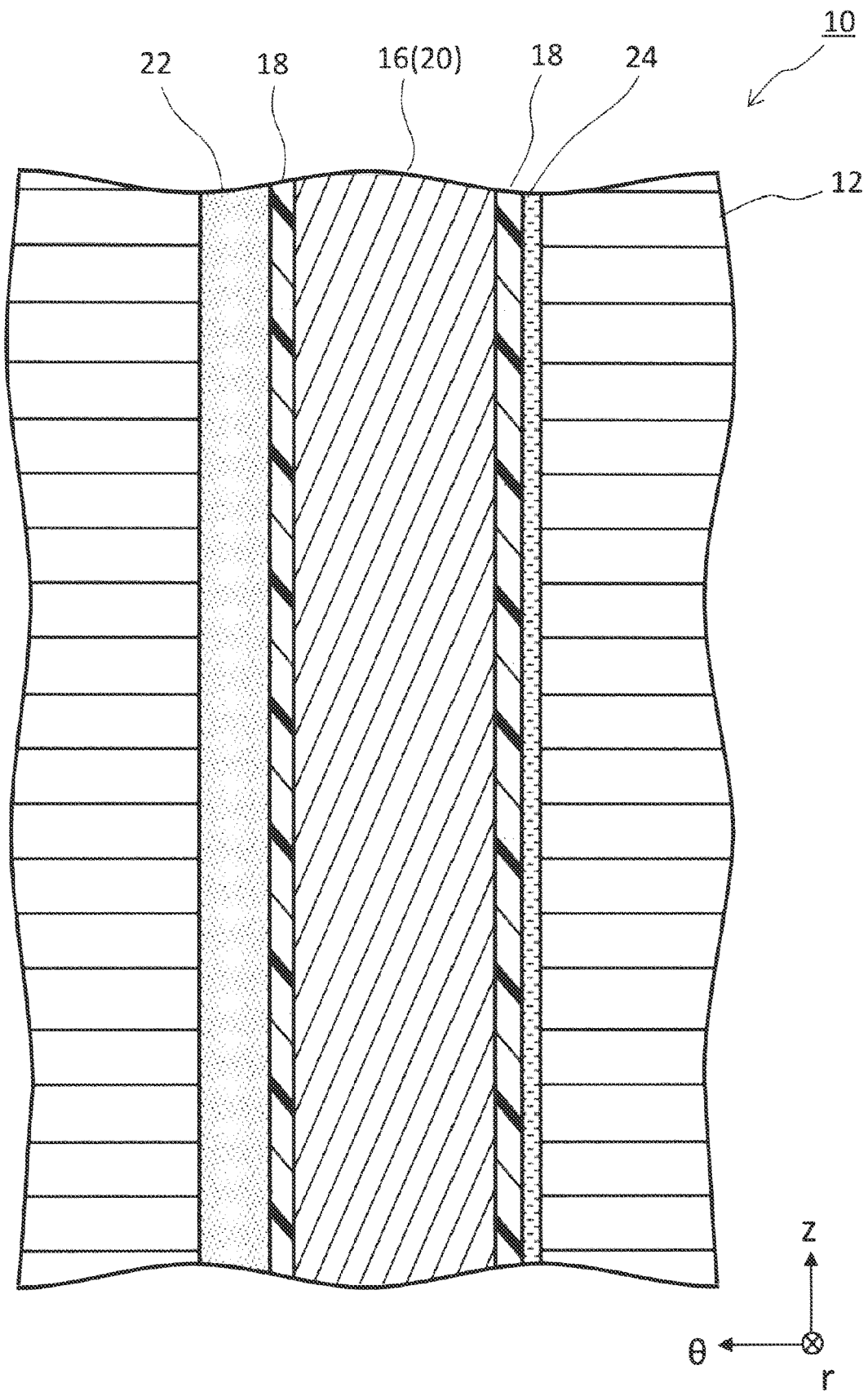
FIG. 3 is a sectional view taken along plane A-A of FIG. 1, which shows the stator in a final stage of the manufacturing process.

Next, a method for manufacturing the stator 10 will be described with reference to FIGS. 2 and 3. FIGS. 2 and 3 are partial cross-sectional views of the stator 10 in plane A-A of FIG. 1. FIG. 2 shows the stator 10 partway through the manufacturing process, and FIG. 3 shows the stator in a final stage of the manufacturing process.

Here, a mode in which the foaming sheet 22 and the heat dissipation sheet 24 are formed using a common insulating sheet will be described. First, a foamable thermosetting resin is applied to a part of the insulating sheet. By impregnating the insulating sheet with the resin, a required amount of resin is held by the insulating sheet. Thus, the foaming sheet 22 partway through the manufacturing process is formed. Next, a heat-dissipating thermosetting resin is applied to an area of the insulating sheet next to the part to which the foamable resin is applied. Thus, the heat dissipation sheet 24 partway through the manufacturing process is formed.

As shown in FIG. 2, in the stator core 12 formed by stacking the electromagnetic steel sheets, the foaming sheet 22 and the heat dissipation sheet 24 partway through the manufacturing process are disposed in the formed slot 14. The foaming sheet 22 is disposed so as to be in contact with the side surface 14a of the slot 14 on one side in the circumferential direction of the stator core 12 and the heat dissipation sheet 24 is disposed so as to be in contact with the side surface 14c on the other side.

In the slot 14, as shown in FIG. 2, the segment coil obtained by bending the rectangular wire 16 covered with the insulating member 18 into a U shape is inserted in the axial direction. In this stage, the foaming sheet 22 is not foamed, so that a slight gap 26 is secured around the rectangular wire 16 covered with the insulating member 18. Thus, the rectangular wire 16 can be inserted smoothly. Then, the tip ends of the segment coils from which the insulating member 18 is peeled off are welded together to form a wound coil 20.

Subsequently, the stator 10 is heated. The heating may be performed, for example, by energizing the coil 20 to generate Joule heat, or may be performed using a separately prepared heat source. With heating, air bubbles are formed inside the foaming sheet 22 so that the foaming sheet 22 expands.

As a result, as shown in FIG. 3, the rectangular wire 16 covered with the insulating member 18 is pressed by the foaming sheet 22 and pressed against the heat dissipation sheet 24. By further heating, the thermosetting resin is thermally cured in the foaming sheet 22 and the heat dissipation sheet 24. In detail, as a result of expansion, the thermosetting resin in the foaming sheet 22 is bonded to the side surface 14a of the slot 14 and the insulating member 18 while being pressed against the side surface 14a and the insulating member 18. Further, the resin in the heat dissipation sheet 24 is bonded to the side surface 14c of the slot 14 and the insulating member 18 while being pressed against the side surface 14c and the insulating member 18, due to a pressing force from the coil 20. Thus, the coil 20 is securely fixed in the slot 14 and the coil 20 is securely held in close contact with the heat dissipation sheet 24.

When the rotary electric machine is in operation, the coil 20 is heated by a current flowing through the rectangular wire 16 so that the temperature thereof rises. In this case, since the foaming sheet 22 has high thermal insulation, the heat from the coil 20 can not be transferred sufficiently. However, the heat dissipation sheet 24 transfers a large amount of heat due to the effect of the filler. Therefore, the heat from the coil 20 is rapidly transferred to the stator core 12 through the heat dissipation sheet 24. Thus, the temperature rise in the coil 20 is suppressed.

In the above description, the foaming sheet 22 and the heat dissipation sheet 24 are formed by applying individual resins to a common insulating sheet. However, the foaming sheet 22 and the heat dissipation sheet 24 may be formed using separate insulating sheets. Also, a mode in which no insulating sheet serving as the base material is used may be adopted. For example, the side surface 14a of the stator core 12 may be coated or charged with a foamable thermosetting resin or the side surface 14c may be coated or charged with a heat-dissipating thermosetting resin.

In the above description, the boundary between the foaming sheet 22 and the heat dissipation sheet 24 is formed on the side surface 14b of the slot 14 in the radial direction. However, no member may be specifically provided on the side surface 14b. Alternatively, an insulating sheet without resin coating may be provided on the side surface 14b. It is also possible to provide the foaming sheet 22 on the entire side surface 14b to increase a compression force of the coil 20 generated due to foaming. In addition, the heat dissipation sheet 24 may be provided on the entire side surface 14b to improve the heat dissipation from the coil 20.

By providing the foaming sheet 22 on the entire side surface 14a of the slot 14, it is possible to improve fixation of the coil 20 and the force of pressing the coil 20. However, the foaming sheet 22 may be provided only on a part of the side surface 14a as long as sufficient fixation and pressing force can be secured. In addition, by providing the heat dissipation sheet 24 on the entire side surface 14c of the slot 14, it is possible to improve the heat dissipation from the coil 20. However, the heat dissipation sheet 24 may be provided only on a part of the side surface 14c as long as sufficient heat dissipation can be secured.

The foaming sheet 22 and the heat dissipation sheet 24 (or the foaming member and the heat-dissipating member without a base material) may be integrated with the coil 20 to be provided in the slot 14 simultaneously with the coil 20. Further, the method of manufacturing the stator may be changed. For example, after the coil 20 is installed, a foamable thermosetting resin with no base material may be charged in place of the foaming sheet 22, and a heat-dissipating thermosetting resin with no base material may be charged in place of the heat dissipation sheet 24.

Furthermore, a mode in which a heat-dissipating insulating sheet is used is conceivable as another embodiment. When a heat-dissipating insulating sheet that can secure sufficient heat dissipation can be used, the heat-dissipating insulating sheet can be used as it is for the heat dissipation sheet 24. It is also possible to use the heat-dissipating insulating sheet as a base material of the foaming sheet 22.

Thus, the embodiment shown in FIGS. 1 to 3 can be achieved by applying only the foamable thermosetting resin to a part of the heat-dissipating insulating sheet without applying the heat-dissipating thermosetting resin. Examples of the heat-dissipating insulating sheet include a silicon sheet having high thermal conductivity, a sheet formed from resin such as acrylic, and the like. As described above, the resin may contain a filler having high thermal conductivity. A sheet having flexibility can facilitate a process to cover the side surfaces 14a, 14b, and 14c of the slot 14 with a single heat-dissipating insulating sheet. However, even if the heat-dissipating insulating sheet is not flexible, it may be possible to use the heat-dissipating insulating sheet by cutting and bending.

What is claimed is:

1. A stator comprising:
   a stator core, the stator core including a plurality of slots arranged in a circumferential direction of the stator core and recessed in a radial direction of the stator core;
   a coil disposed in each of the slots;
   an insulating heat-dissipating member disposed between the stator core and the coil on one of two side surfaces of the slots in the circumferential direction of the stator core; and
   an insulating foaming member disposed between the stator core and the coil on the other of the two side surfaces of the slot in the circumferential direction of the stator core.

2. The stator according to claim 1, wherein:
   the insulating heat-dissipating member is a member having a heat-dissipating material bonded to an insulating sheet; and
   the insulating foaming member is a member having a foamable material bonded to an insulating sheet.

3. The stator according to claim 1, wherein:
   the insulating heat-dissipating member is a heat-dissipating insulating sheet;
   the heat-dissipating insulating sheet is disposed between the stator core and the coil so as to surround the coil in the slot; and
   the insulating foaming member is a member having a foamable material bonded to the heat-dissipating insulating sheet.

* * * * *